United States Patent [19]

Mielnicka-Pate et al.

[11] Patent Number: 4,655,086

[45] Date of Patent: Apr. 7, 1987

[54] METHOD AND MEANS FOR MEASURING SOUND INTENSITY

[75] Inventors: Anna Mielnicka-Pate; David K. Holger, both of Ames, Iowa

[73] Assignee: Iowa State University Research Foundation, Inc., Ames, Iowa

[21] Appl. No.: 728,890

[22] Filed: Apr. 30, 1985

[51] Int. Cl.[4] .......................................... G01N 29/00
[52] U.S. Cl. ...................................... 73/646; 73/648; 73/655; 367/178
[58] Field of Search .................. 73/645, 646, 647, 648, 73/657, 655; 367/178

[56] References Cited

U.S. PATENT DOCUMENTS

| 3,364,813 | 1/1968 | McKinney. | |
|---|---|---|---|
| 3,435,656 | 4/1969 | Jordan et al.. | |
| 4,125,025 | 11/1978 | Suzuki | 73/655 |
| 4,236,040 | 11/1980 | Chung | 73/646 |
| 4,422,167 | 12/1983 | Shajenko | 73/655 |
| 4,463,453 | 7/1984 | Cohen et al. | 73/583 |
| 4,466,738 | 8/1984 | Huang et al. | 73/657 |

FOREIGN PATENT DOCUMENTS

| 894631 | 12/1981 | U.S.S.R. | 73/646 |
|---|---|---|---|
| 971074 | 3/1982 | U.S.S.R. | 73/646 |

Primary Examiner—Howard A. Birmiel
Attorney, Agent, or Firm—Zarley, McKee, Thomte, Voorhees & Sease

[57] ABSTRACT

Sound intensity is determined by simultaneously measuring instantaneous acoustic pressure and instantaneous particle velocity at a single point. A condenser microphone having a vibrating diaphragm generates an output voltage proportional to the instantaneous acoustic pressure. A laser Doppler vibrometer measures the velocity of the vibrating diaphragm and a Doppler frequency tracker converts the velocity measurement into another output voltage which is proportional to the instantaneous acoustic particle velocity. The sound intensity is then calculated from the known components.

24 Claims, 1 Drawing Figure

METHOD AND MEANS FOR MEASURING SOUND INTENSITY

BACKGROUND OF THE INVENTION

Sound intensity is a function of acoustic pressure and acoustic particle velocity. In measuring sound intensity at a particular location in an acoustic field, it is necessary to determine the instantaneous acoustic pressure and the component of instantaneous acoustic particle velocity in the direction of interest. Once these components are known, any of a number of well known systems can be utilized to calculate intensity. Typical known methods of calculation involve time averaging or spectrum averaging.

For example, if a time averaging system is used, the component of the sound intensity in the direction of interest, $I_n$ can be calculated using the integral equation:

$$I_n = \frac{1}{T} \int_0^T p u_n dt$$

where p=instantaneous acoustic pressure; $u_n$=component of the instantaneous acoustic particle velocity in the n-direction; T=averaging time; I=sound intensity; dt=derivative over time.

Alternatively, sound intensity in the direction of interest, $I_n$ can be calculated using spectrum averaging from the equation $$I_n = \tfrac{1}{2} \text{Re}\{P(w)U_n^*(w)\}$$

where Re {} denotes the real part of the enclosed expression and P(w) and $U_n(w)$ are complex Fourier transforms of the acoustic pressure and component of the acoustic particle velocity in the n-direction respectively. In this equation, $U_N^*(w)$ is the complex conjugate of $U_n(w)$.

In the past, three basic types of intensity probes have been used for measuring sound intensity. Such known probes usually utilize a pair of closely spaced microphones or a microphone and an accelerometer for determining acoustic pressure and acoustic particle velocity. However, because the acoustic pressure and particle velocity are not measured at exactly the same point in space, the sound intensity calculated therefrom is in error.

Therefore, a primary objective of the present invention is the provision of a method and means for more accurately calculating sound intensity.

Another objective of the present invention is the provision of a method and means for calculating sound intensity by measuring the acoustic pressure and acoustic particle velocity at the same point in space.

A further objective of the present invention is the provision of a method and means for determining sound intensity wherein acoustic particle velocity and acoustic pressure are measured directly.

These and other objectives will become apparent from the following description of the invention.

SUMMARY OF THE INVENTION

The present invention relates to a method and means of determining sound intensity by measuring the instantaneous acoustic particle velocity and instantaneous acoustic pressure at a single point. Sound intensity can then be calculated from these two components.

The acoustic pressure is measured by subjecting a microphone to the sound such that the microphone diaphragm vibrates. A microphone output voltage is generated by the vibrating diaphragm and is proportional to the instantaneous acoustic pressure.

The instantaneous acoustic particle velocity is measured by projecting a laser beam onto the vibrating diaphragm and reflecting the beam from the diaphragm so that the Doppler frequency shift of the beam can be detected. A laser Doppler vibrometer is used to project the beam and detect the Doppler frequency shift of the beam. The Doppler frequency shift of the beam is then converted by a Doppler frequency tracker into a tracker output voltage which is proportional to the instantaneous acoustic particle velocity. The sound intensity is calculated from the voltages by employing any well-known average technique, such as time averaging or spectrum averaging.

DETAILED DESCRIPTION OF THE DRAWINGS

Figure 1:
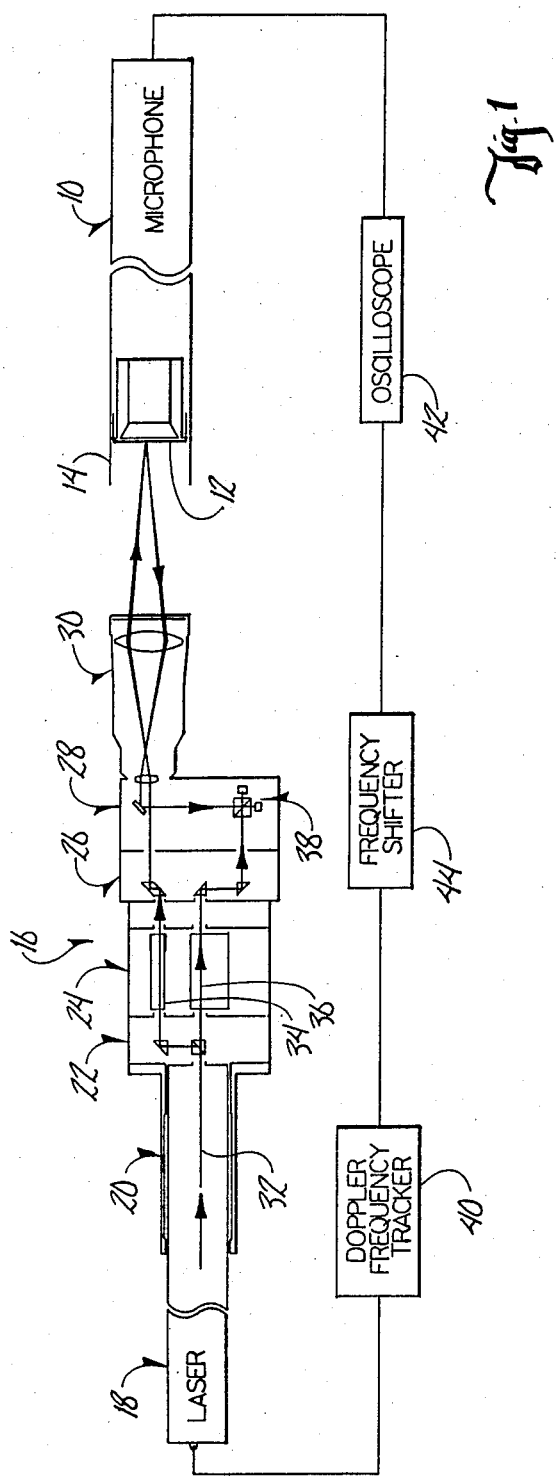
FIG. 1 is a schematic of the device of the present invention for determining sound intensity.

The method and means of the present invention determines sound intensity by simultaneously measuring the instantaneous acoustic particle velocity and the instantaneous acoustic pressure at a single point within an acoustic field and calculating the intensity from such measurements. With reference to FIG. 1, a conventional condenser microphone 10 having a diaphragm 12 therein is subjected to the acoustic field whose characteristics are being measured. A cylindrical or conical shield 14 may be attached to microphone 10 adjacent diaphragm 12 to increase the directional nature of microphone 10. The acoustic field impinges on diaphragm 12 which vibrates in response thereto. A microphone output voltage is generated in response to the vibrating diaphragm 12. This microphone output voltage is proportional to the instantaneous acoustic pressure.

The instantaneous acoustic particle velocity is determined by measuring the instantaneous velocity of the vibrating diaphragm 12. A laser Doppler vibrometer, generally designated by the reference numeral 16, is utilized for measuring the diaphragm velocity. Other similar measuring devices incorporating fiber optics may also be used. One such laser Doppler vibrometer 16 is manufactured by Disa Electronics, 779 Susquehanna Avenue, Franklin Lakes, N.J. 07417, Model No. 55X.

Laser Doppler vibrometer 16 includes a laser 18, for example, a helium-neon laser with a 220 volt or 110 volt exciter. A laser adapter 20 connects laser 18 to a beam splitter 22 which in turn is connected to a Bragg cell 24. A vibrometer adapter 26 interconnects a vibrometer 28 to Bragg cell 24. An adjustable optical lens 30 is detachably mounted on the forward end of vibrometer 28 and may be interchanged with other lenses to accommodate various measurement parameters.

Laser Doppler vibrometer 16 operates to measure the velocity of diaphragm 12 by means of the detection of the Doppler shift of light reflected from the vibrating diaphragm. More particularly, laser 18 emits a laser beam 32 which is split by beam splitter 22 into a source beam 34 and a reference beam 36. Source beam 34 is then frequency shifted by Bragg cell 24 and focused onto the surface of diaphragm 12 by vibrometer 28 and optical lens 30. Source beam 34 is reflected or backscattered from diaphragm 12 and routed to the photo detector 38 within vibrometer 28 via optical lens 30 and the various lenses, mirrors and prisms within vibrometer 28. Photo detector 38 is a dual diode detector assembly and detects the Doppler frequency shift of source beam 34 by comparing source beam 34 with reference beam 36 which is also received in photo detector 38.

Laser Doppler vibrometer 16 is operatively connected to a Doppler frequency tracker 40, such as Model 55N20 sold by Disa Electronics, which converts the Doppler frequency shift of source beam 34 to a tracker output voltage which is proportional to the instantaneous diaphragm velocity and thus proportional to the instantaneous acoustic particle velocity. An oscilloscope 42 operatively connected to tracker 40 and microphone 10 depicts the tracker and microphone output voltages. While oscilloscope 42 is one means for displaying the output voltages, any known means may be utilized, either digital or analog. A frequency shifter 44, such as Model No. 55N10 sold by Disa Electronics, is also operatively connected to laser Doppler vibrometer 16 so as to control the frequency shift of source beam 34 by Bragg cell 24.

Thus, both the instantaneous acoustic pressure and the instantaneous acoustic particle velocity are simultaneously determined at a single point, that point being the center of the surface of diaphragm 12, such that sound intensity within the acoustic field can be calculated therefrom using known equations.

From the foregoing, it can be seen that the present invention accomplishes at least all of the stated objectives.

What is claimed is:

1. A device for determining sound intensity within an acoustic field, comprising:
   first means in said acoustic field for measuring instantaneous acoustic pressure at a single point, and including a microphone having a diaphragm adapted to vibrate in response to the acoustic field thereby producing a microphone output voltage proportional to said instantaneous acoustic pressure at said diaphragm, and
   second means in said acoustic field for measuring instantaneous acoustic particle velocity at said single point and including a laser Doppler vibrometer spaced apart from said microphone for measuring the velocity of said diaphragm as said diaphragm vibrates in response to the acoustic field, said diaphragm velocity being proportional to said instantaneous acoustic particle velocity.

2. The device of claim 1 wherein said laser Doppler vibrometer includes a laser for emitting a laser beam, a beam splitter positioned between said laser and said microphone for splitting said laser beam into a source beam and a reference beam, a Bragg cell positioned between said beam splitter and said microphone for frequency shifting said source beam, and a vibrometer positioned between said Bragg cell and said microphone for focusing said source beam onto said diaphragm and for receiving said source beam reflected from said diaphragm and for detecting the Doppler frequency shift of said reflected source beam as compared to said reference beam, said Doppler frequency shift being a function of said velocity of said diaphragm.

3. The device of claim 1 wherein said second means further includes a Doppler frequency tracker operatively connected to said laser Doppler vibrometer for converting said measurement thereof to a tracker output voltage proportional to said instantaneous acoustic particle velocity.

4. The device of claim 3 wherein said second means further includes a frequency shifter operatively connected to said Doppler frequency tracker for controlling said laser Doppler vibrometer.

5. The device of claim 3 further comprising an oscilloscope operatively connected to said frequency tracker and to said microphone for depicting said tracker output voltage and said microphone output voltage.

6. The device of claim 1 wherein shield means are attached to said microphone such that said acoustic field impinges on said diaphragm from only one direction.

7. The device of claim 1 wherein said microphone is a directional microphone.

8. The device of claim 1 wherein said microphone is a condenser microphone.

9. A method of determining sound intensity, comprising:
   measuring instantaneous acoustic particle velocity at a single point,
   measuring instantaneous acoustic pressure at a single point,
   calculating said intensity from said measurement using an averaging equation including the multiple product of said velocity and pressure measurements;
   said instantaneous acoustic pressure being measured at a point in an acoustic field from the effect of the field on a target which moves in response to said field and generating a first electrical voltage in response to said movement of said target, said first electrical voltage being proportioned to said instantaneous acoustic pressure;
   said instantaneous acoustic particle velocity being measured by measuring the instantaneous velocity of said moving target, said velocity of said moving target being proportional to said instantaneous velocity of said acoustic particle.

10. The method of claim 9 wherein said measurements are taken simultaneously.

11. The method of claim 9 wherein said target is a diaphragm of a microphone.

12. The method of claim 9 wherein said instantaneous velocity of said moving target is measured by projecting a laser beam onto said moving target, reflecting said laser beam from said target, and detecting the Doppler frequency shift of said laser beam.

13. The method of claim 12 wherein a laser Doppler vibrometer projects said laser beam, receives said reflected laser beam, and detects the Doppler frequency shift thereof.

14. The method of claim 12 wherein the measurement of said instantaneous velocity of said moving target further includes converting said detected Doppler frequency shift of said laser beam to a second electrical voltage, said second electrical voltage being proportional to said instantaneous acoustic particle velocity.

15. The method of claim 14 wherein a Doppler frequency tracker converts said Doppler frequency shift of said laser beam to said second electrical voltage.

16. The method of claim 14 further comprising registering said first and second electrical voltages such that said sound intensity can be calculated therefrom.

17. The method of claim 17 wherein said averaging equation is $$I_n = \tfrac{1}{2}\mathrm{Re}\{P(w)U_n^*(w)\}$$

wherein $I_n$ = sound intensity in the direction of interest, Re {} denotes the real part of the enclosed expression and $P(w)$ and $U_n(w)$ are complex Fourier transforms of the acoustic pressure and component of the acoustic particle velocity in the n-direction respectively, and $U_n^*(w)$ is the complex conjugate of $U_n(w)$.

18. A method of determining sound intensity, comprising: measuring instantaneous acoustic particle velocity at a single point,
  measuring instantaneous acoustic pressure at said single point;
  calculating said intensity from said measurements using an averaging equation including the multiple product of said velocity and pressure measurements;
  said averaging equation being $$I_n = \frac{1}{T} \int_0^T p u_n dt$$

wherein $I_n$ = sound intensity in the direction of interest, p = instantaneous acoustic pressure, $u_n$ = component of the instantaneous acoustic particle velocity in the n-direction, and T = averaging time.

19. A device for determining sound intensity within an acoustic field, comprising:
  first means in said acoustic field for measuring instantaneous acoustic pressure at a single point, and including a target adapted to move in response to the acoustic field thereby producing a target output voltage proportional to said instantaneous acoustic pressure at said target, and
  second means in said acoustic field for measuring instantaneous acoustic particle velocity at said single point by measuring the velocity of said target as said target moves in response to the acoustic field, said target velocity being proportional to said instantaneous acoustic particle velocity.

20. The device of claim 19 wherein said target is the diaphragm of a microphone.

21. The device of claim 20 wherein said second means includes a laser Doppler vibrometer spaced apart from said microphone for measuring the velocity of said diaphragm, and a Doppler frequency tracker operatively connected to said laser Doppler vibrometer for converting said measurement thereof to a tracker output voltage proportional to said instantaneous acoustic particle velocity.

22. The device of claim 21 wherein said laser Doppler vibrometer includes a laser for emitting a laser beam, a beam splitter positioned between said laser and said microphone for splitting said laser beam into a source beam and a reference beam, a Bragg cell positioned between said beam splitter and said microphone for frequency shifting said source beam, and a vibrometer positioned between said Bragg cell and said microphone for focusing said source beam into said diaphragm and for receiving said source beam reflected from said diaphragm and for detecting the Doppler frequency shift of said reflected source beam as compared to said reference beam, said Doppler frequency shift being a function of said velocity of said diaphragm.

23. The device of claim 21 wherein said second means further includes a frequency shifter operatively connected to said Doppler frequency tracker for controlling said laser Doppler vibrometer.

24. The device of claim 21 further comprising an oscilloscope operatively connected to said frequency tracker and to said microphone for depicting said tracker output voltage and said target output voltage.

* * * * *